United States Patent
Yamauchi

(10) Patent No.: US 8,144,252 B2
(45) Date of Patent: Mar. 27, 2012

(54) NOISE REDUCTION APPARATUS AND NOISE REDUCTION METHOD

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 943 days.

(21) Appl. No.: 12/047,772

(22) Filed: Mar. 13, 2008

(65) Prior Publication Data

US 2008/0239154 A1  Oct. 2, 2008

(30) Foreign Application Priority Data

Mar. 30, 2007  (JP) .................. 2007-092093

(51) Int. Cl.
*H04N 5/00* (2006.01)
*H04N 5/21* (2006.01)
*G06K 9/34* (2006.01)
*G06K 9/38* (2006.01)
*G06K 9/40* (2006.01)

(52) U.S. Cl. ........ 348/607; 348/622; 348/627; 348/620; 382/168; 382/169; 382/170; 382/171; 382/172; 382/260; 382/261; 382/262; 382/263

(58) Field of Classification Search .............. 348/607, 348/620, 622, 627; 382/168–172, 260, 263–265
See application file for complete search history.

(56) References Cited

U.S. PATENT DOCUMENTS

| | | | | |
|---|---|---|---|---|
| 5,949,916 A | * | 9/1999 | Chun | 382/261 |
| 7,145,607 B1 | * | 12/2006 | Hui | 348/607 |
| 7,626,639 B2 | * | 12/2009 | Yamauchi | 348/607 |
| 7,821,579 B2 | * | 10/2010 | Lin et al. | 348/607 |

FOREIGN PATENT DOCUMENTS

| | | |
|---|---|---|
| JP | 61-009083 | 1/1986 |
| JP | 61-075675 | 4/1986 |
| JP | 05-328174 | 12/1993 |
| JP | 06-086103 | 3/1994 |
| JP | 6-253264 A | 9/1994 |
| JP | 08-125918 | 5/1996 |
| JP | 10-191260 | 7/1998 |
| JP | 10-191268 A | 7/1998 |
| JP | 2001-169144 | 6/2001 |
| JP | 3226799 | 8/2001 |
| JP | 2002-010106 A | 1/2002 |
| JP | 2004-96628 A | 3/2004 |
| JP | 2006-013735 | 1/2006 |

OTHER PUBLICATIONS

Japanese Office Action dated Jul. 26, 2011.

* cited by examiner

*Primary Examiner* — Kristine Kincaid
*Assistant Examiner* — Omar S Parra
(74) *Attorney, Agent, or Firm* — Pillsbury Winthrop Shaw Pittman, LLP

(57) ABSTRACT

According to one embodiment, an input image signal is passed through a plurality of first high pass filters having different passing frequency band to generate level histograms. High frequency component noise reduction processing is applied to the output of one of the first high pass filters selected based on one of the generated histograms that satisfies a predetermined threshold, low frequency component noise reduction processing is applied to a result obtained by subtracting the output of the selected first high pass filter from the input image signal, and outputs obtained by both the noise reduction processing are added.

9 Claims, 7 Drawing Sheets

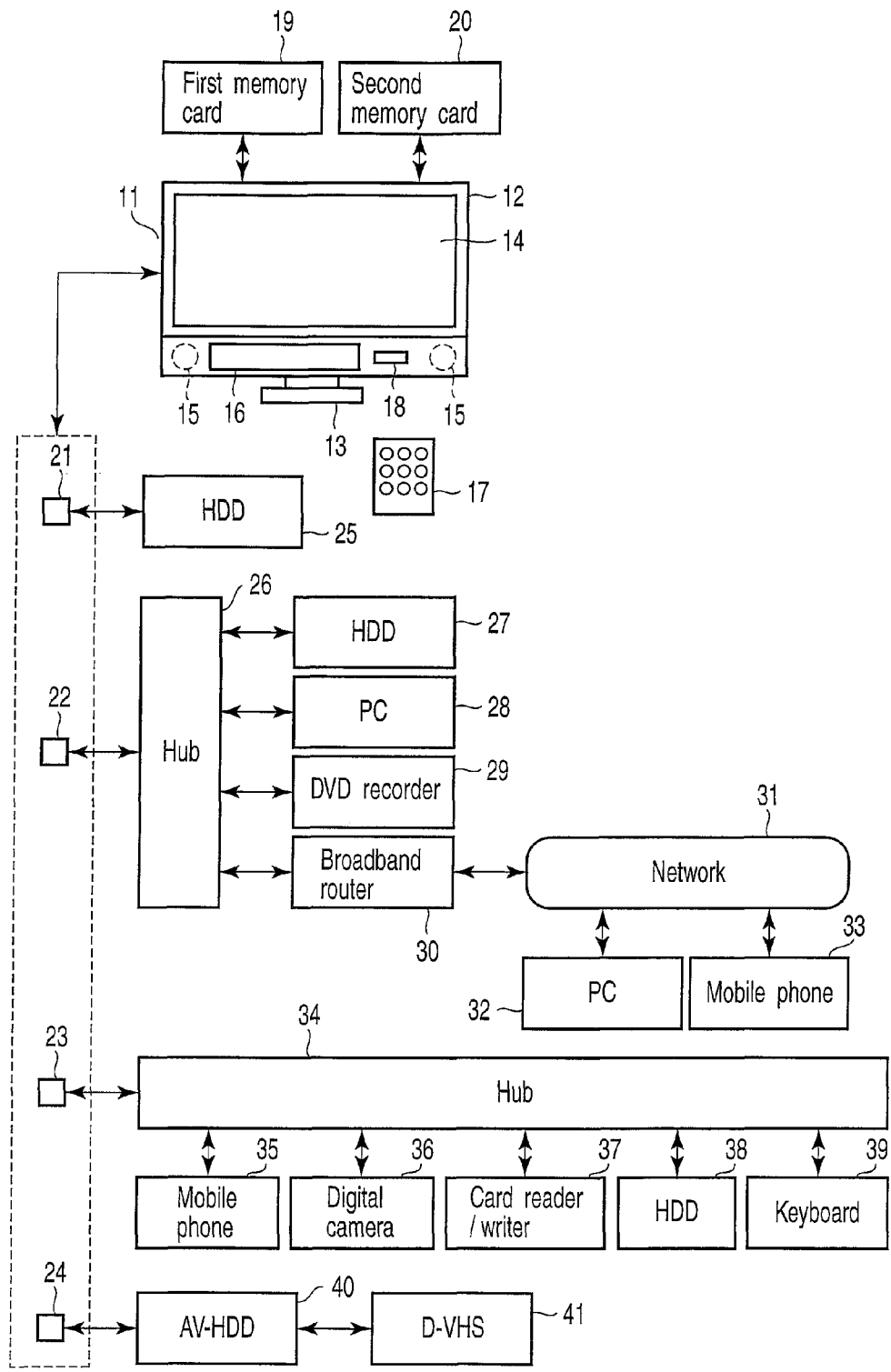
F I G. 1

NOISE REDUCTION APPARATUS AND NOISE REDUCTION METHOD

CROSS-REFERENCE TO RELATED APPLICATIONS

This application is based upon and claims the benefit of priority from Japanese Patent Application No. 2007-092093, filed Mar. 30, 2007, the entire contents of which are incorporated herein by reference.

BACKGROUND

1. Field

One embodiment of the invention relates to a noise reduction apparatus and a noise reduction method suitably applied to an image signal processing system in a digital TV broadcasting receiver.

2. Description of the Related Art

As is known, in recent years, digitization of TV broadcasting has been promoted. For example, in Japan, not only satellite digital broadcasting such as BS (broadcasting satellite) digital broadcasting and 110-degree CS (communication satellite) digital broadcasting, but also terrestrial digital broadcasting has been started.

In such digital television broadcasting, an HD (high definition) type image signal having a high spatial frequency and ensuring a high quality image and a image signal having a low spatial frequency obtained by upconverting an SD (standard definition) type image signal providing a standard quality image are used in a mixed manner.

A frequency band containing a noise component differs between the image signal having a high spatial frequency and image signal having a low spatial frequency. Thus, when noise reduction processing is applied to a received image signal in a digital TV broadcasting receiver that receives such type of digital TV broadcasting, it is necessary to take into consideration the fact that a frequency band containing a noise component differs between image signals having different spatial frequencies.

Jpn. Pat. Appln. Publication No. 2004-096628 discloses a cyclic-type noise reduction apparatus. When controlling a feedback amount based on a movement amount detection signal obtained for each divided frequency band, the noise reduction apparatus adjusts a movement amount detection signal on the high frequency side using a movement amount detection signal on the lowermost frequency side to thereby improve an afterimage reduction effect at the high frequency region.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view of an embodiment of the present invention, which schematically shows an example of an outer appearance of a digital TV broadcasting receiver and a network system built around the digital TV broadcasting receiver;

DETAILED DESCRIPTION

Figure 2:
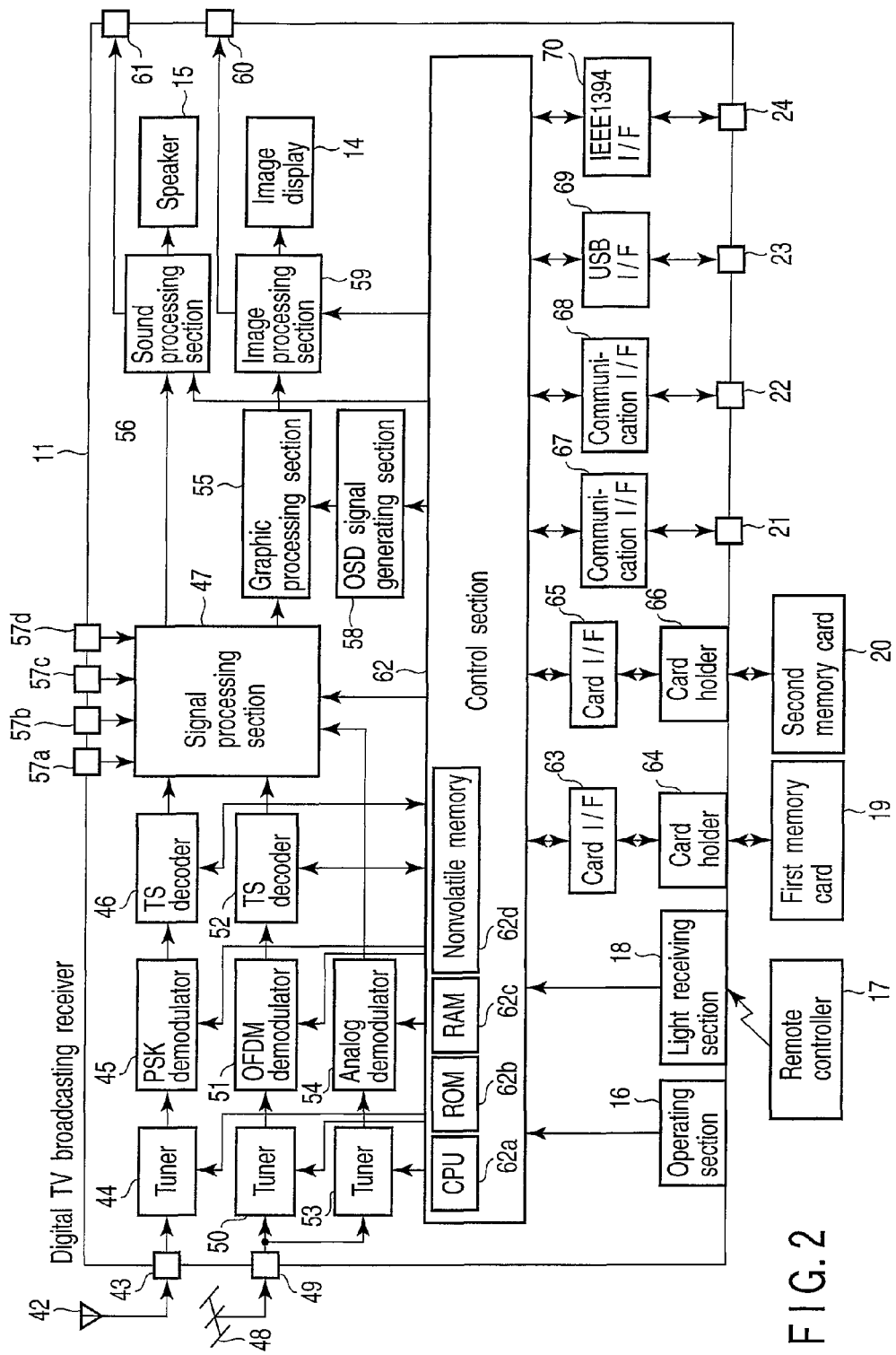
FIG. 2 is a block diagram explaining a main signal processing system provided in the digital TV broadcasting receiver in the present embodiment.

Various embodiments according to the invention will be described hereinafter with reference to the accompanying drawings. In general, according to one embodiment of the invention, an input image signal is passed through a plurality of first high pass filters having different passing frequency band to generate level histograms. High frequency component noise reduction processing is applied to the output of one of the first high pass filters selected based on one of the generated histograms that satisfies a predetermined threshold, low frequency component noise reduction processing is applied to a result obtained by subtracting the output of the selected first high pass filter from the input image signal, and outputs obtained by both the noise reduction processing are added.

FIG. 1 schematically shows an example of an outer appearance of a digital TV broadcasting receiver 11 and a network system built around the digital TV broadcasting receiver 11 in the present embodiment.

The digital TV broadcasting receiver 11 is mainly composed of a thin type cabinet 12 and a supporting stand 13 that supports the cabinet 12 in a standing position. The cabinet 12 is provided with a flat panel type image display 14 composed of a liquid crystal display panel or the like, a pair of speakers 15, an operating section 16, a light receiving section 18 that receives operation information transmitted from a remote controller 17, and the like.

A first memory card 19 such as an SD (secure digital) memory card, an MMC (multimedia card) or a memory stick can be attached/detached to/from the digital TV broadcasting receiver 11. Information such as a program and a picture can be recorded/reproduced in/from the first memory card 19.

Further, a second memory card (IC (integrated circuit) card) 20 in which contract information or the like is recorded can be attached/detached to/from the digital TV broadcasting receiver 11. The contraction information is recorded/reproduced in/from the second memory card 20.

Further, the digital TV broadcasting receiver 11 has a first LAN (local area network) terminal 21, a second LAN terminal 22, a USB (universal serial bus) terminal 23 and an IEEE (institute of electrical and electronics engineers) 1394 terminal 24.

The first LAN terminal 21 is used as an HDD exclusive port compatible with LAN, and is used in order to record/reproduce information via Ethernet (registered trademark) in/from an HDD (hard disk drive) 25 compatible with LAN which is a connected NAS (network attached storage).

When the first LAN terminal 21 as the HDD exclusive port compatible with LAN is provided, information about a program with hi-vision image quality can be recorded stably into the HDD 25 without being influenced by another network environment, network use condition and the like.

Further, the second LAN terminal 22 is used as a general LAN-compatible port using Ethernet (registered trademark), and is connected to a device such as an LAN compatible HDD 27, a PC (personal computer) 28, a DVD (digital versatile disk) recorder 29 containing HDD having a digital broadcasting receiving function or the like via, for example, a hub 26 so as to be used for transmitting information to these devices.

Further, the second LAN terminal 22 is connected to a network 31 such as the Internet via a broadband router 30 connected to the hub 26, and is used for transmitting information to a PC 32, a mobile phone 33 or the like via the network 31.

The USB terminal 23 is used as a general USB compatible port. The USB terminal 23 is connected to an USB device such as a mobile phone 35, a digital camera 36, a reader/writer 37 for a memory card, an HDD 38 or a keyboard 39 via a hub 34, for example, and is used for transmitting information to the USB devices.

Further, the IEEE 1394 terminal 24 is serially connected to an AV (audio video)-HDD 40, a D (digital)-VHS (video home system) 41 or the like each of which has a digital broadcasting receiving function, and is used for transmitting information to these devices.

FIG. 2 shows a main signal processing system of the digital TV broadcasting receiver 11. That is, a satellite digital television broadcasting signal which is received by an antenna 42 for receiving BS/CS digital broadcasting is supplied to a tuner 44 for satellite digital broadcasting via an input terminal 43 so that a broadcasting signal of a desired channel is selected.

The broadcasting signal selected by the tuner 44 is supplied to a PSK (phase shift keying) demodulator 45 where a TS (transport stream) is demodulated from the received broadcasting signal. The TS is then supplied to a TS decoder 46, decoded and separated into a digital image signal and a digital audio signal, and then outputted to the signal processing section 47.

Further, a terrestrial digital television broadcasting signal which is received by an antenna 48 for receiving ground-based broadcasting is supplied to a tuner 50 for terrestrial digital broadcasting via an input terminal 49 so that a broadcasting signal of a desired channel is selected.

The broadcasting signal which is selected by the tuner 50 is supplied to an OFDM (orthogonal frequency division multiplexing) demodulator 51 where a TS is demodulated from the received broadcasting signal. The TS is then supplied to a TS decoder 51, decoded and separated into a digital image signal and a digital audio signal, and then outputted to the signal processing section 47.

Further, a terrestrial analog television broadcasting signal which is received by the antenna 48 for receiving ground-based broadcasting is supplied to a tuner 53 for terrestrial analog broadcasting via the input terminal 49 so that a broadcasting signal of a desired channel is selected. The broadcasting signal selected by the tuner 53 is supplied to an analog demodulator 54 and is demodulated into analog image signal and sound signal so as to be output to the signal processing section 47.

The signal processing section 47 selectively applies predetermined digital signal processing to the digital image signal and sound signal supplied from the TS decoders 46 and 52 so that the signals are output to a graphic processing section 55 and a sound processing section 56.

Further, the signal processing section 47 is connected to a plurality (four in the drawing) of input terminals 57a, 57b, 57c and 57d. The analog image signal and sound signal can be input from the outside of the digital TV broadcasting receiver 11 into the input terminals 57a to 57d.

The signal processing section 47 selectively digitalizes the analog image signal and sound signal supplied from the analog demodulator 54 and the input terminals 57a to 57d, and applies predetermined digital signal processing to the digitalized image signal and sound signal. Thereafter, the signal processing section 47 outputs the processed signals to the graphic processing section 55 and the sound processing section 56.

The graphic processing section 55 has a function of superposing an OSD (on screen display) signal generated by an OSD signal generating section 58 on a digital image signal supplied from the signal processing section 47 so as to output it. The graphic processing section 55 can selectively output an output image signal of the signal processing section 47 and an output OSD signal of the OSD signal generating section 58, or can output them so that both the outputs compose a half of the screen, respectively.

The digital image signal output from the graphic processing section 55 is supplied to an image processing section 59. After the image processing section 59 converts the input digital image signal into an analog image signal with a format which can be displayed on the image display 14, it outputs the analog image signal to the image display 14 so that the image is displayed and is led to the outside via an output terminal 60.

After the sound processing section 56 converts the input digital sound signal into an analog sound signal with a format which can be reproduced in the speaker 15, it outputs the analog sound signal to the speaker 15 so that the sound is reproduced and is led to the outside via an output terminal 61.

All the operations including the above-mentioned various receiving operations in the digital TV broadcasting receiver 11 are controlled by a control section 62. The control section 62 contains a CPU (central processing unit) 62a. The control section 62 receives operation information from the operating section 16, or receives operation information transmitted from the remote controller 17 via the light receiving section 18, and controls the respective sections so that the operation contents are reflected.

In this case, the control section 62 mainly utilizes an ROM (read only memory) 62b which stores control programs to be executed by the CPU 62a, an RAM (random access memory) 62c which provides an operation area to the CPU 62a, and an nonvolatile memory 62d which stores various setting information, control information and the like therein.

The control section 62 is connected to a card holder 64 to which the first memory card 19 can be attached via a card I/F (interface) 63. As a result, the control section 62 can transmit information to the first memory card 19 attached to the card holder 64 via the card I/F 63.

Further, the control section 62 is connected to a card holder 66 to which the second memory card 20 can be attached via a card I/F 65. As a result, the control section 62 can transmit information to the second memory card 20 attached to the card holder 66 via the card I/F 65.

The control section 62 is connected to the first LAN terminal 21 via a communication I/F 67. As a result, the control section 62 can transmit information to the LAN compatible HDD 25 connected to the first LAN terminal 21 via the communication I/F 67. In this case, the control section 62 has a DHCP (dynamic host configuration protocol) server function, and allocates an IP (internet protocol) address to the LAN compatible HDD 25 connected to the first LAN terminal 21 so as to control it.

Further, the control section 62 is connected to the second LAN terminal 22 via a communication I/F 68. As a result, the control section 62 can transmit information to the respective devices (see FIG. 1) connected to the second LAN terminal 22 via the communication I/F 68.

The control section 62 is connected to the USB terminal 23 via an USB I/F 69. As a result, the control section 62 can transmit information to the respective devices (see FIG. 1) connected to the USB terminal 23 via the USB I/F 69.

Further, the control section 62 is connected to the IEEE 1394 terminal 24 via an IEEE 1394 I/F 70. As a result, the control section 62 can transmit information to the respective devices (see FIG. 1) connected to the IEEE 1394 terminal 24 via the IEEE 1394 I/F 70.

The signal processing section 47 performs noise reduction processing as one of the predetermined digital signal processing applied to the digitalized image signal. The noise reduction processing can appropriately and effectively reduce noise components contained in the image signals having different spatial frequencies while suppressing after image in consideration of the frequency band containing the noise components which differs between the image signals having different spatial frequencies.

Figure 3:
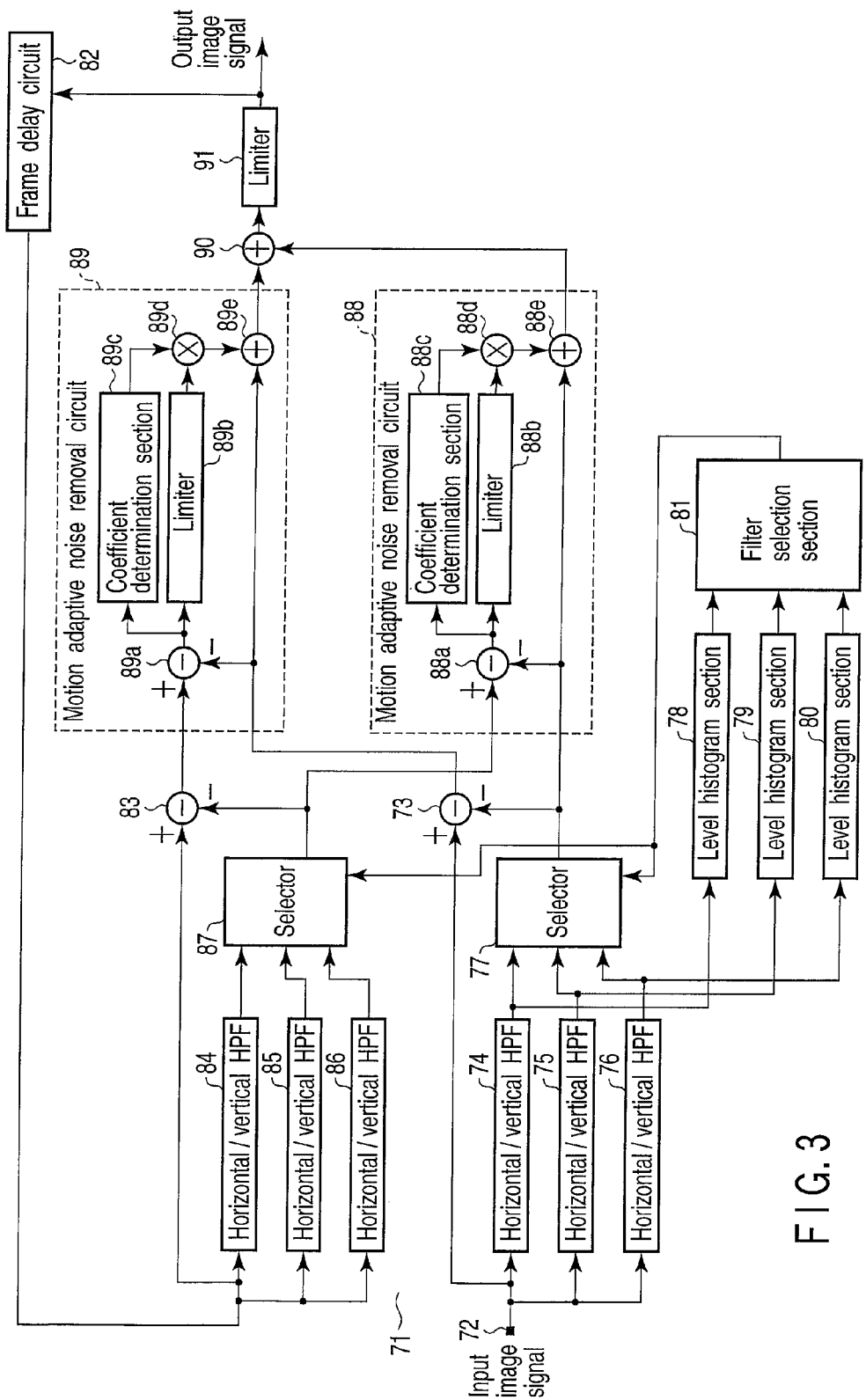
FIG. 3 is a block diagram explaining a noise reduction processing section built in the digital TV broadcasting receiver in the present embodiment.

FIG. 3 shows a noise reduction processing section 71 built in the signal processing section 47. The digital image signal input to an input terminal 72 is supplied to the positive-side input terminal (+) of a subtractor 73, as well as to three horizontal/vertical HPFs (high pass filters) 74, 75, and 76.

The HPFs 74, 75, and 76 are high frequency band-pass filters adjusted for different frequency bands. That is, the HPF 74 has the highest passing frequency band, and the passing frequency band becomes lower in the order of the HPF 75 and HPF 76. Outputs (high frequency range signal) of the HPFs 74, 75, and 76 are supplied to a selector 77.

Further, the outputs of the HPFs 74, 75, and 76 are supplied respectively to level histogram sections 78, 79, and 80. The level histogram sections 78, 79, and 80 count the number of in-plane pixels of image signals input from the HPFs 74, 75, and 76 for each amplitude level thereof to thereby generate level histograms.

The level histograms generated by the level histogram sections 78, 79, and 80 are supplied to a filter selection decision section 81. Although details will be described later, the filter selection decision section 81 compares the input level histogram with a predetermined threshold value to thereby select one of the outputs of the HPFs 74, 75, and 76 and allows the selector 77 to output the selected output.

The digital image signal that has been subjected to the noise reduction processing by the noise reduction section 71 and output therefrom is delayed by one frame period by a frame delay circuit 82 and then supplied to the positive-side input terminal (+) of a subtractor 83, as well as to three horizontal/vertical HPFs 84, 85, and 86.

The three HPFs 84, 85, and 86 have the same passing frequency bands as those of the abovementioned HPFs 74, 75, and 76, respectively. Outputs (high frequency range signal) of the HPFs 84, 85, and 86 are supplied to a selector 87. Like the selector 77, the selector 87 is controlled by the filter selection decision section 81.

An output (high frequency range signal) of the selector 77 and output (frame delay high frequency range signal) of the selector 87 are supplied to a motion-adaptive noise elimination circuit 88 including a subtractor 88a, a limiter 88b, a coefficient determination section 88c, a multiplier 88d, and an adder 88e, whereby noise reduction processing is executed for a high frequency range component.

Further, a signal (low frequency range signal) obtained by the subtractor 73 subtracting the output (high frequency range signal) of the selector 77 from an image signal input thereto and signal (frame delay low frequency range signal) obtained by the subtractor 83 subtracting the output (frame delay high frequency range signal) of the selector 87 from an output of the frame delay circuit 82 are supplied to a motion-adaptive noise elimination circuit 89 including a subtractor 89a, a limiter 89b, a coefficient determination section 89c, a multiplier 89d, and an adder 89e, whereby noise reduction processing is executed for a low frequency range component.

The image signals output respectively from the motion-adaptive noise elimination circuits 88 and 89 are added by an adder 90 and output, via a limiter 91, as a digital image signal that has been subjected to the noise reduction processing to the outside, as well as to the frame delay circuit 82.

Figure 4:
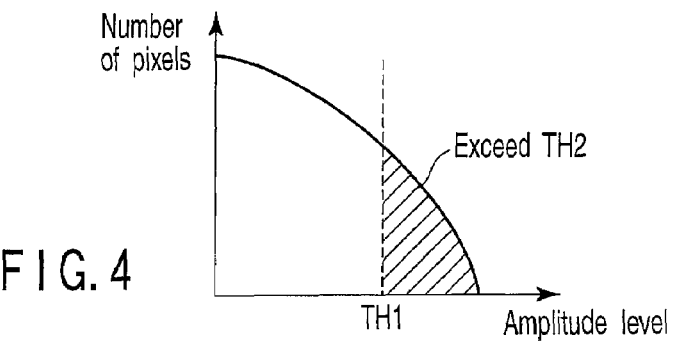
FIG. 4 is a view explaining a level histogram generated by a level histogram section of the noise reduction processing section in the present embodiment, which represents the level of an image signal having a high spatial frequency.

In the case where the digital image signal input to the input terminal 72 is an image signal having a high spatial frequency, the noise components thereof are mainly contained in the high frequency range. Therefore, in a level histogram of FIG. 4 that the level histogram section 78 generates based on the output of the HPF 74 having the highest passing frequency band, the number of pixels having an amplitude level exceeding a predetermined threshold value TH1 corresponds to the number of those exceeding a predetermined threshold value TH2.

The filter selection decision section 81 refers to the histogram that the level histogram section 78 generates based on the output of the HPF 74 having the highest passing frequency band to determine whether the number of pixels having an amplitude level exceeding a predetermined threshold value TH1 corresponds to the number of those exceeding a predetermined threshold value TH2. If corresponds, the filter selection decision section 81 controls the selector 77 to take out the output of the HPF 74 that has supplied the high frequency range image signal to the level histogram section 78 that has generated the histogram. At the same time, the filter section decision section 81 controls the selector 87 to take out the output of the HPF 84.

If the number of pixels having an amplitude level exceeding a predetermined threshold value TH1 does not reach the number of those exceeding a predetermined threshold value TH2 in the level histogram generated by the level histogram section 78, the filter selection decision section 81 refers to a level histogram that the level histogram section 79 generates based on the output of the HPF 75 having a passing frequency band one step lower than the passing frequency band of the HPF 74 to determine whether the number of pixels having an amplitude level exceeding a predetermined threshold value TH1 corresponds to the number of those exceeding a predetermined threshold value TH2.

If corresponds, the filter selection decision section 81 controls the selector 77 to take out the output of the HPF 75 that has supplied the high frequency range image signal to the level histogram section 79 that has generated the level histogram. At the same time, the filter selection decision section 81 controls the selector 87 to take out the output of the HPF 85.

If the number of pixels having an amplitude level exceeding a predetermined threshold value TH1 does not reach the number of those exceeding a predetermined threshold value TH2 in the level histogram generated by the level histogram section 79, the filter selection decision section 81 automatically makes the selector 77 take out the output of the HPF 76.

At the same, the filter selection decision section 81 controls the selector 87 to take out the output of the HPF 86.

As described above, in the case where the digital image signal input to the input terminal 72 is an image signal having a high spatial frequency, the noise components thereof are mainly contained in the high frequency range, so that the level histogram that the level histogram section 78 generates based on the output of the HPF 74 having the highest passing frequency band satisfies a condition that the number of pixels having an amplitude level exceeding a predetermined threshold value TH1 corresponds to the number of those exceeding a predetermined threshold value TH2.

Therefore, in the case of the input image signal having a high spatial frequency, the frequency bands of the image signals supplied to the motion-adaptive noise elimination circuits 88 and 89 are determined based on the outputs of the HPFs 74 and 84 each having the highest passing frequency band. Thus, the noise reduction effect of the motion-adaptive noise elimination circuit 88 is increased with respect to a high frequency range signal containing noise component and noise reduction effect of the motion-adaptive noise elimination circuit 89 is reduced with respect to a signal in the other frequency range (low frequency range), whereby appropriate noise reduction processing considering the frequency band containing the noise components which differs between the image signals having different spatial frequencies can be applied to thereby achieving effective noise reduction while suppressing afterimage.

Figure 5A:
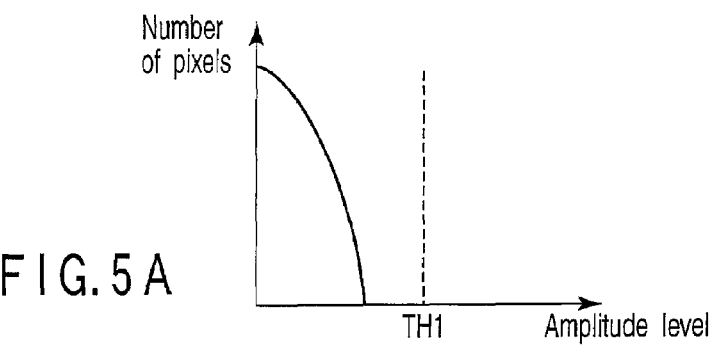
FIGS. 5A to 5C are views each explaining a level histogram generated by a level histogram section of the noise reduction processing section in the present embodiment, which represents the level of an image signal having a low spatial frequency.

In the case where the digital image signal input to the input terminal 72 is an image signal having a low spatial frequency, the noise components thereof are mainly contained in a lower frequency range than in the case of an image signal having a high spatial frequency. That is, as shown in FIG. 5A, the number of pixels having an amplitude level exceeding a predetermined threshold value TH1 does not reach the number of those exceeding a predetermined threshold value TH2 in the level histogram that the level histogram section 78 generates based on the output of the HPF 74 having the highest passing frequency band.

Figure 5B:
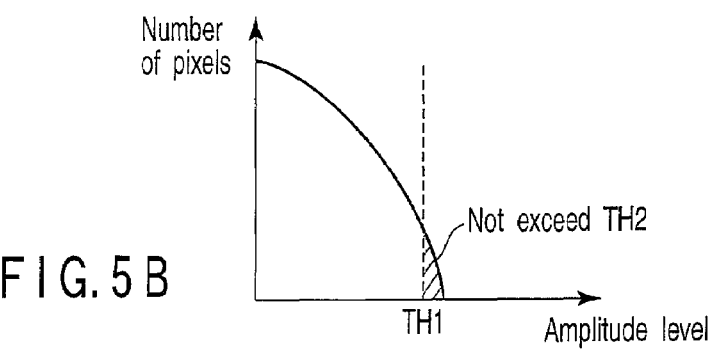
Figure 5C:
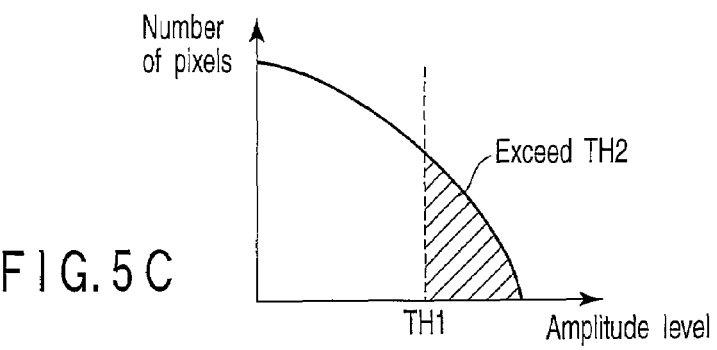

Further, as shown in FIG. 5B, the number of pixels having an amplitude level exceeding a predetermined threshold value TH1 does not reach the number of those exceeding a predetermined threshold value TH2 in the level histogram that the level histogram section 79 generates based on the output of the HPF 75 having a passing frequency band one step lower than the passing frequency band of the HPF 74. On the other hand, as shown in FIG. 5C, the number of pixels having an amplitude level exceeding a predetermined threshold value TH1 corresponds to the number of those exceeding a predetermined threshold value TH2 in the level histogram that the level histogram section 80 generates based on the output of the HPF 76 having the lowest passing frequency band.

Therefore, in the case of the input image signal having a low spatial frequency, the frequency bands of the image signals supplied to the motion-adaptive noise elimination circuits 88 and 89 are determined based on the outputs of the HPFs 76 and 86 each having the lowest passing frequency band. As a result, appropriate noise reduction processing considering the frequency band containing the noise components which differs between the image signals having different spatial frequencies can be applied to thereby achieving effective noise reduction while suppressing afterimage.

Although the horizontal/vertical HPFs 74 to 76 and 84 to 86 are used in the noise reduction processing section 71 shown in FIG. 3, it is possible to use a horizontal high pass filer or vertical high pass filter according to need.

Figure 6:
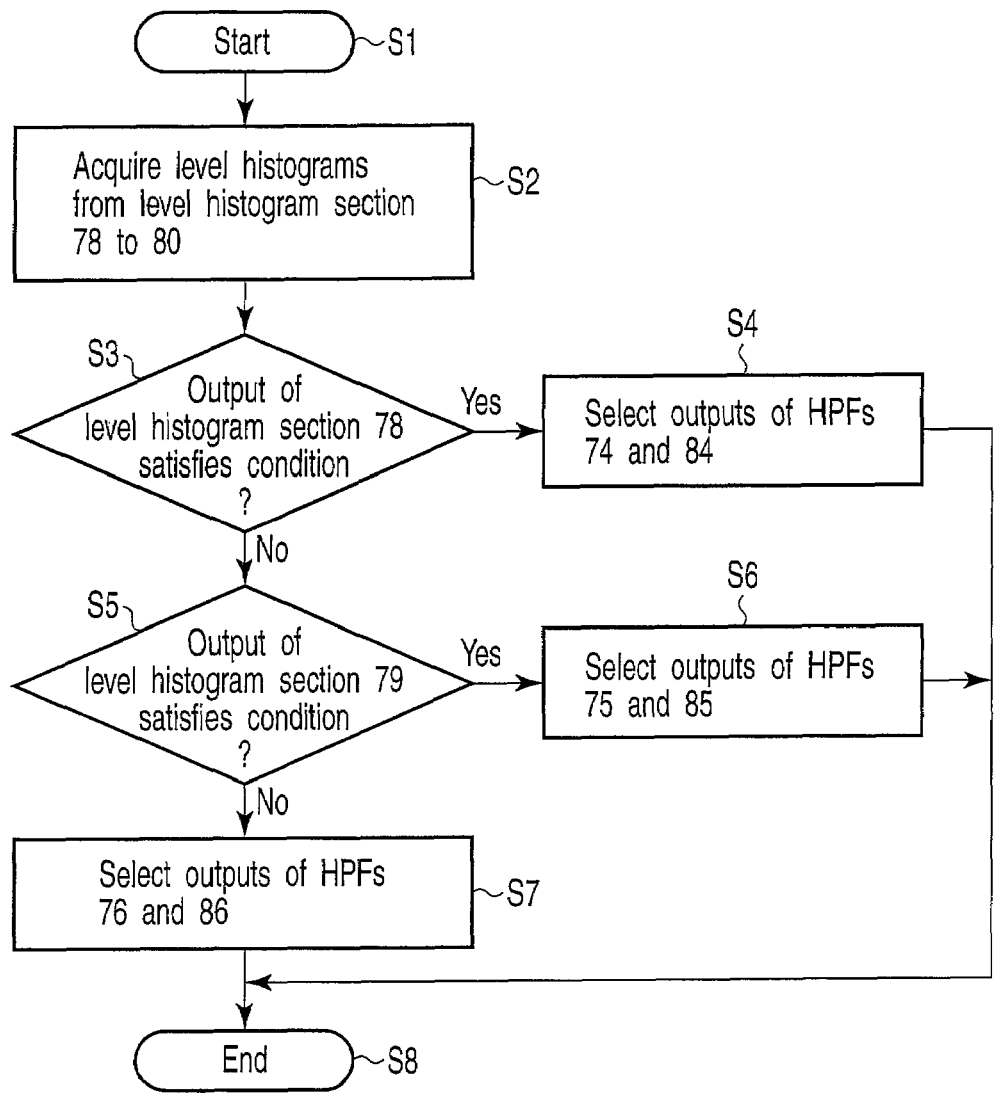
FIG. 6 is a flowchart showing a processing operation of a filer selection section of the noise reduction processing section in the present embodiment.

FIG. 6 is a flowchart summarizing the processing operation of the filter selection decision section 81. When the processing is started (step S1), the filter selection decision section 81 acquires level histograms generated by the level histogram sections 78, 79, and 80 in step 2.

In step S3, the filter selection decision section 81 determines whether the number of pixels having an amplitude level exceeding a predetermined threshold value TH1 corresponds to the number of those exceeding a predetermined threshold value TH2 in the level histogram generated by the level histogram section 78. If corresponds (YES), the filter selection decision section 81 controls the selectors 77 and 87 to select the outputs of the HPFs 74 and 84 in step S4, and the processing is ended (step S8).

If, in step S3, the number of pixels having an amplitude level exceeding a predetermined threshold value TH1 does not reach the number of those exceeding a predetermined threshold value TH2 in the level histogram generated by the level histogram section 78 (NO), the filter selection decision section 81 determines whether the number of pixels having an amplitude level exceeding a predetermined threshold value TH1 corresponds to the number of those exceeding a predetermined threshold value TH2 in the level histogram generated by the level histogram section 79 in step S5. If corresponds (YES), the filter selection decision section 81 controls the selectors 77 and 87 to select the outputs of the HPFs 75 and 85 in step S6, and the processing is ended (step S8).

Further, if, in step S5, the number of pixels having an amplitude level exceeding a predetermined threshold value TH1 does not reach the number of those exceeding a predetermined threshold value TH2 in the level histogram generated by the level histogram section 79 (NO), the filter selection decision section 81 automatically makes the selectors 77 and 87 select the outputs of the HPFs 76 and 86 in step S7, and the processing is ended (step S8).

Figure 7:
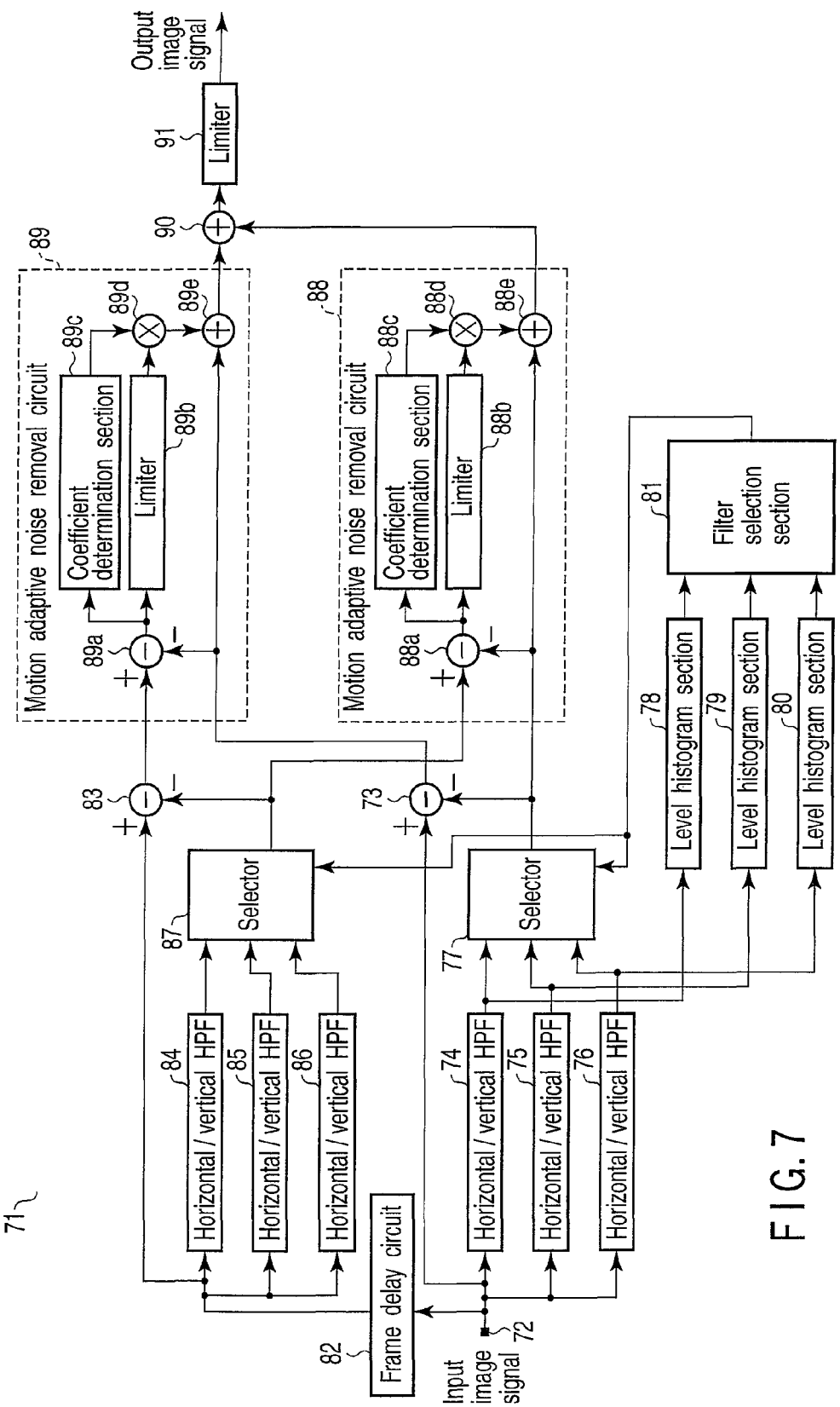
FIG. 7 is a block diagram explaining a modification of the noise reduction processing section in the present embodiment.

FIG. 7 shows a modification of the noise reduction processing section 71. In a configuration of FIG. 7, in which the same reference numerals denote the same or corresponding parts as in FIG. 3, an image signal input to the input terminal 72 is delayed by one frame period by the frame delay circuit 82 and then supplied to the positive-side input terminal (+) of the subtractor 83, as well as to three horizontal/vertical HPFs 84, 85, and 86. Also with this configuration, it is possible to obtain the same effect as the embodiment shown in FIG. 3.

Figure 8:
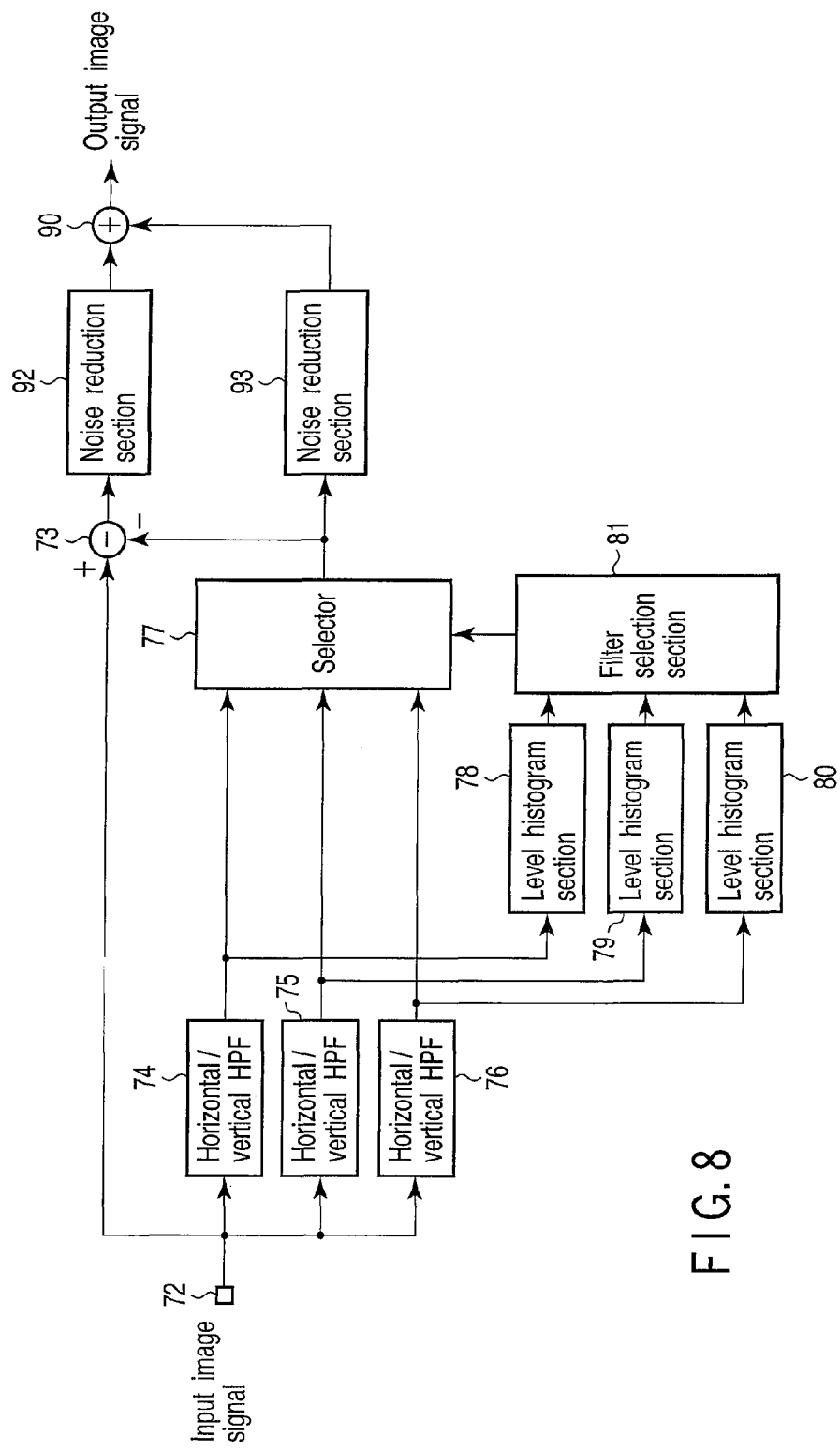
FIG. 8 is a block diagram explaining another modification of the noise reduction processing section in the present embodiment.

FIG. 8 shows another modification of the noise reduction processing section 71. In a configuration of FIG. 8, in which the same reference numerals denote the same or corresponding parts as in FIG. 3, a low frequency range signal output from the subtractor 73 is subjected to the noise reduction processing by a noise reduction section 92, and high frequency range signal output from the selector 77 is subjected to the noise reduction processing by a noise reduction section 93. Also with this configuration, appropriate noise reduction processing considering the frequency band containing the noise components which differs between the image signals having different spatial frequencies can be applied to thereby achieving effective noise reduction while suppressing afterimage.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A noise reduction apparatus comprising:
an input section which inputs an image signal;
a plurality of first high pass filters which receive the image signal input to the input section and which have different passing frequency bands;
a plurality of level histogram generation sections which are provided so as to correspond to the plurality of first high pass filters and each of which generates a level histogram representing the number of pixels of the image signal counted for each amplitude level thereof;
a detection section which detects one of the level histograms generated by the plurality of level histogram generation sections that satisfy a predetermined threshold value;
a first selection section which selects the output of the first high pass filter that has supplied its output to the level histogram generation section that has generated the level histogram detected by the detection section;
a first noise reduction section which applies high frequency component noise reduction processing to the output of the first high pass filter selected by the first selection section;
a first subtractor which subtracts the output of the first high pass filter selected by the first selection section from the image signal input to the input section;
a second noise reduction section which applies low frequency component noise reduction processing to the output of the first subtracter; and
an adder which adds outputs of the first and second noise reduction sections.

2. The noise reduction apparatus according to claim 1, further comprising:
a delay section which delays a noise reduction processed image signal output from the adder on a per frame basis;
a plurality of second high pass filters which receive the frame-delayed image signal from the delay section and which have the same passing frequency bands as those of the plurality of first high pass filters, respectively;
a second selection section which selects, based on a detection result of the detection section, an output of the second high pass filter having the same passing frequency band as that of the first high pass filter selected by the first selection section; and
a second subtractor which subtracts an output of the second high pass filter selected by the second selection section from the frame-delayed image signal received from the delay section, wherein
the first noise reduction section is a motion adaptive noise reduction circuit that receives the output of the first high pass filter selected by the first selection section and output of the second high pass filter selected by the second selection section, and
the second noise reduction section is a motion adaptive noise reduction section that receives the outputs of the first and second subtractors.

3. The noise reduction apparatus according to claim 1, further comprising:
a delay section which delays an image signal input to the input section on a per frame basis;
a plurality of second high pass filters which receive the frame-delayed image signal from the delay section and which have the same passing frequency bands as those of the plurality of first high pass filters, respectively;
a second selection section which selects, based on a detection result of the detection section, an output of the second high pass filter having the same passing frequency band as that of the first high pass filter selected by the first selection section; and
a second subtractor which subtracts an output of the second high pass filter selected by the second selection section from the frame-delayed image signal received from the delay section, wherein
the first noise reduction section is a motion adaptive noise reduction circuit that receives the output of the first high pass filter selected by the first selection section and output of the second high pass filter selected by the second selection section, and
the second noise reduction section is a motion adaptive noise reduction section that receives the outputs of the first and second subtractors.

4. The noise reduction apparatus according to claim 1, wherein
the detection section detects one of the level histograms generated by the respective histogram generation sections, in which the number of pixels having an amplitude level exceeding a first threshold value corresponds to the number of those exceeding a second threshold value.

5. The noise reduction apparatus according to claim 1, wherein
the detection section determines whether the level histogram that the level histogram generation section has generated based on the output of the first high pass filter having the highest passing frequency band of the plurality of first high pass filters satisfies a predetermined threshold value and, if not satisfy, determines whether the level histogram that the level histogram generation section has generated based on the output of the first high pass filter having a passing frequency band one step lower than the first high pass filter having the highest passing frequency band satisfies a predetermined threshold value.

6. The noise reduction apparatus according to claim 1, wherein
the first high pass filter configured to be a horizontal high pass filter, a vertical high pass filter, or horizontal/vertical high pass filter.

7. An image output apparatus comprising:
an input section which inputs an image signal;
a plurality of first high pass filters which receive the image signal input to the input section and which have different passing frequency bands;
a plurality of level histogram generation sections which are provided so as to correspond to the plurality of first high pass filters and each of which generates a level histogram representing the number of pixels of the image signal counted for each amplitude level thereof;
a detection section which detects one of the level histograms generated by the plurality of level histogram generation sections that satisfies a predetermined threshold value;
a first selection section which selects an output of the first high pass filter that has supplied its output to the level histogram generation section that has generated the level histogram detected by the detection section;
a first noise reduction section which applies high frequency component noise reduction processing to the output of the first high pass filter selected by the first selection section;

a first subtractor which subtracts the output of the first high pass filter selected by the first selection section from the image signal input to the input section;

a second noise reduction section which applies low frequency component noise reduction processing to an output of the first subtractor;

an adder which adds outputs of the first and second noise reduction sections; and an output section which outputs the noise reduction processed image signal received from the adder.

8. A noise reduction method comprising:

inputting an image signal;

supplying the input image signal to a plurality of first high pass filters which have different passing frequency bands;

supplying outputs of the plurality of first high pass filters, in a corresponding manner, to a plurality of level histogram generation sections each of which generates a level histogram representing the number of pixels of the image signal counted for each amplitude level thereof;

detecting one of the level histograms generated by the plurality of level histogram generation sections that satisfies a predetermined threshold value;

selecting an output of the first high pass filter that has supplied its output to the level histogram generation section that has generated the detected level histogram;

applying high frequency component noise reduction processing to the output of the selected first high pass filter;

subtracting the output of the selected first high pass filter from the image signal input to the input section;

applying low frequency component noise reduction processing to the output obtained by the subtraction; and adding outputs obtained by the high frequency component noise reduction processing and low frequency component noise reduction processing.

9. The noise reduction method according to claim 8, wherein the detecting detects whether the level histogram that the level histogram generation section has generated based on the output of the first high pass filter having the highest passing frequency band of the plurality of first high pass filters satisfies a condition that the number of pixels having an amplitude level exceeding a first threshold value corresponds to the number of those exceeding a second threshold value and, if not satisfy, detecting whether the level histogram that the level histogram generation section has generated based on the output of the first high pass filter having a passing frequency band one step lower than the first high pass filter having the highest passing frequency band satisfies a condition that the number of pixels having an amplitude level exceeding a first threshold value corresponds to the number of those exceeding a second threshold value.

* * * * *